United States Patent [19]

Taylor

[11] 4,398,877
[45] Aug. 16, 1983

[54] SHEETING OF BISCUIT DOUGH

[75] Inventor: Peter A. Taylor, Deeping St. James, England

[73] Assignee: Baker Perkins Holdings Limited, Peterborough, England

[21] Appl. No.: 268,475

[22] Filed: May 29, 1981

[30] Foreign Application Priority Data

Jun. 18, 1980 [GB] United Kingdom ............... 8019865

[51] Int. Cl.³ .................. A21C 3/02; B29C 15/00
[52] U.S. Cl. ............................ 425/145; 226/108; 425/194; 425/363
[58] Field of Search ............ 425/363, 145, 296, 302.1, 425/308, 324.1, 141, 367, 394, 406, 135; 226/108

[56] References Cited

U.S. PATENT DOCUMENTS

| 968,110 | 8/1910 | Barbieri | 425/363 |
| 1,189,868 | 7/1916 | Reed | 425/367 |
| 1,575,213 | 3/1926 | Kohler | 425/363 |
| 2,687,698 | 8/1954 | Duffy | 425/363 |
| 2,687,699 | 8/1954 | Oakes | 425/363 |
| 2,725,828 | 12/1955 | Stickelber | 425/363 |
| 2,938,474 | 5/1960 | Filler | 425/308 |
| 3,391,221 | 7/1968 | Gore et al. | 525/178 |
| 3,686,376 | 8/1972 | Ayers | 264/40.7 |
| 3,734,659 | 5/1973 | Harris | 425/145 |
| 3,991,013 | 11/1976 | Pletcher | 57/140 R |
| 4,336,013 | 6/1982 | Hand | 425/145 |

FOREIGN PATENT DOCUMENTS 2025265 12/1970 Fed. Rep. of Germany .

Primary Examiner—Willard E. Hoag
Attorney, Agent, or Firm—Watson, Cole, Grindle & Watson

[57] ABSTRACT

The feed of a sheet of biscuit dough via gauge rollers to cutting apparatus is automatically adjusted to compensate for variations in the thickness of the sheet emerging from the gauge rollers, by measuring the power consumed by or the torque applied to an electrical drive unit driving the gauge rollers, producing an electrical signal proportional to the measured power or torque, and utilizing the signal to adjust the feed of the sheet and correct over- or under-feed to the gauge rollers.

4 Claims, 6 Drawing Figures

SHEETING OF BISCUIT DOUGH

BACKGROUND OF THE INVENTION

In the manufacture of biscuits by the cutting method, wherein dough is formed into a continuous sheet which is gauged to the desired thickness by passage through a pair of gauge rollers having a pre-set gap and then fed to cutting apparatus which cuts the biscuit shapes from the continuous sheet, it is very important to present the cutting section of the biscuit forming plant with a dough sheet of constant thickness so that biscuits cut from the sheet will be of a constant weight. Constant weight of cooked biscuits is the aim of all biscuit manufacturers as it enables them to produce packs of wrapped biscuits as close as possible to the minimum weight required by present legalisation.

It is known that the thickness of a sheet of dough emerging from between a pair of gauge rollers, set with the gap between them at a constant desired size, is dependent upon the quantity of dough being fed to the rollers. It is possible to over-feed and under-feed and yet produce a sheet across the full width of the gauge rollers on the output side thereof, but as sheet thickness is dependent upon the correct rate of feed, the sheet would be unacceptable.

In ideal operating conditions the sheet passing through the gauge rollers spreads out as far as flanges provided on both edges of one of the rolls and any slight over-feed will flow backwards. With a significant over-feed the compression of the dough, as it passes between the rollers, increases since the dough, due to its elasticity, tends to revert, on the output side of the rollers to a thickness greater than that desired. This is termed spring or recovery of dough. Also with over-feed the amount of work put into the dough by the increased compression tends to change its characteristics and this can be detrimental to the quality of the cooked biscuits.

Under-feed can result in the gauge rollers tending to pull the sheet and stretch it so that undesirable tension is set up in the sheet before it passes between the rollers. Under-feed can result in the sheet spreading out to the flanges but being thinner at the edges than in the centre, so that some of the biscuits cut from the sheet will be too thin to be acceptable. As the under-feed increases, the sheet can in extreme circumstances become narrower than the required width and not spread completely across the width of the gauging rollers.

It is known to sense these variations in the dough feed conditions by measuring the thickness of the sheet before and/or after the gauge rollers and using the resulting information to effect control of the feed. The measuring devices can be of the contacting type such as wheels or skids running on the dough surface, or may be non-contacting optical sensors, such as those disclosed in British Pat. No. 1484996. The signals derived from these measuring devices can be used, for instance, to control a variable speed motor driving a belt conveyor feeding the dough sheet to the gauge rollers.

SUMMARY OF THE INVENTION

The present invention is based on the discovery that the power required to run an electrical drive unit driving the gauge rolls, which may be an electrical motor or a unit embodying an electromagnetic coupling, changes as the dough feed rate changes from over-feeding to under-feeding and vice versa. Accordingly, the invention is based on the concept of utilizing changes in the required power to effect corresponding and compensating changes in the rate of feed of the dough to the gauge rollers. Since, notwithstanding the changes in power required by the drive unit when the dough feed rate differs from the desired value, the speed of rotation of the gauge rolls remains substantially constant, varying only within a range of 1 to 2%, and since power is the product of torque and speed, the invention includes effecting control of the dough feed in response to variations in the torque being applied to the gauge rolls.

Thus a transducer measuring the power consumption can be used to provide an electrical signal, in either analogue or digital form, which is proportional to the power being consumed. This signal can then be used to effect control of dough feed as required to maintain ideal condition. Alternatively, the torque applied to the gauge rolls may be measured and compared with a set reference level and the rate of feed of the dough adjusted to compensate for discrepancies between the measured torque and the reference level.

The invention therefore provides a method of controlling the feed of a sheet of biscuit dough to a pair of gauge rollers driven by an electric drive unit, which comprises measuring the power consumed by or the torque applied to the drive unit, producing an electrical signal proportional to the measured power or torque, and utilizing the signal to adjust the feed of the sheet so as to correct over- or under-feed of the sheet to the gauge rollers.

The invention will now be further explained with reference to the accompanying drawings

DETAILED DESCRIPTION OF THE PREFERRED EMBODIMENT

Figure 1:
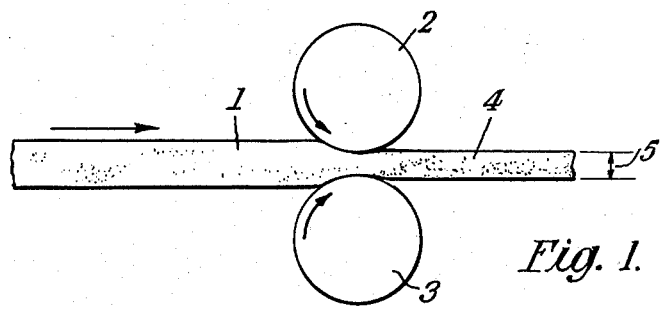
FIGS. 1–4 are diagrams showing various conditions of feed of a sheet of dough to a pair of gauge rollers.

FIG. 1 shows a dough sheet 1 being fed under ideal conditions to a pair of gauge rollers 2 and 3 and emerging as a gauged sheet 4 of a required thickness 5.

Figure 2:
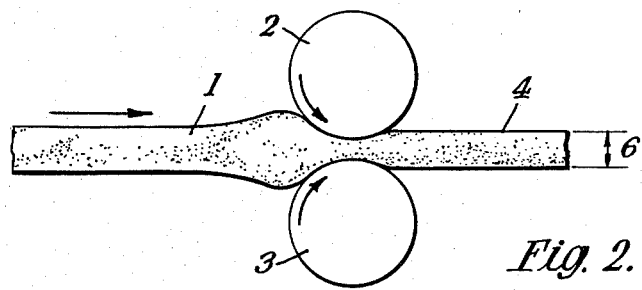

FIG. 2 shows a condition of over-feeding, which causes the dough sheet 1 to bulge at the input side of the gauge rollers 2 and 3 and the gauged sheet 4 to spring back to a thickness 6 greater than that required.

Figure 3:
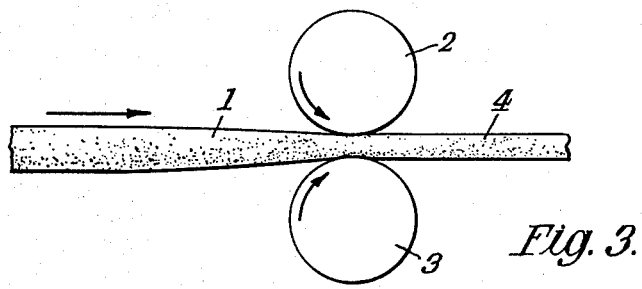
Figure 4:
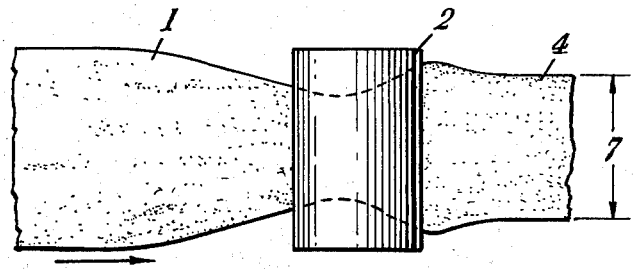

FIGS. 3 and 4 show an under-feed condition, which causes the dough sheet 1 to be pulled into the rollers 2 and 3. The pulling action causes the dough sheet 1 to stretch so that it is no longer of full width as it passes between the rollers and does not completely span the surface of the rollers. Also the emerging sheet 4 after leaving the rollers tends to spring or relax back to an underwidth 7.

Figure 5:
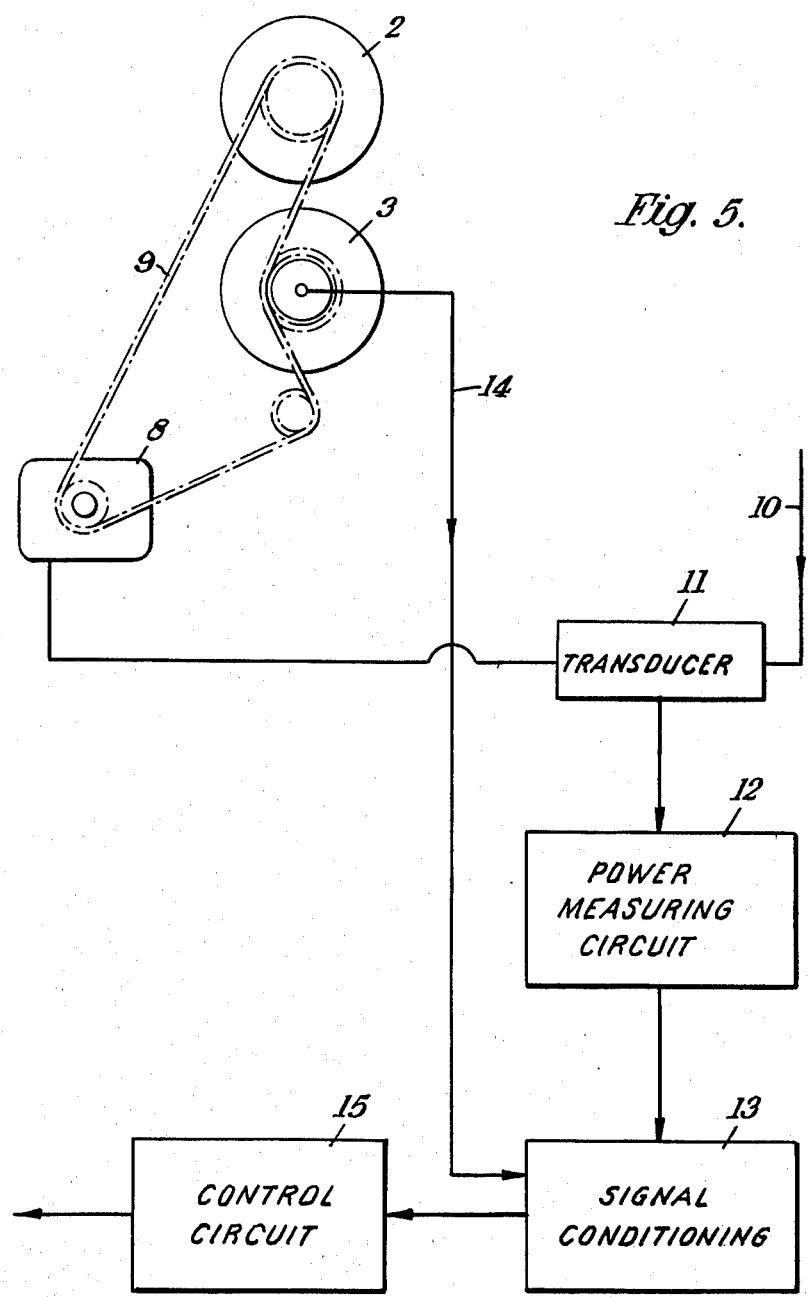
FIG. 5 is a block circuit diagram illustrating correction of the feed of the sheet.
Figure 6:
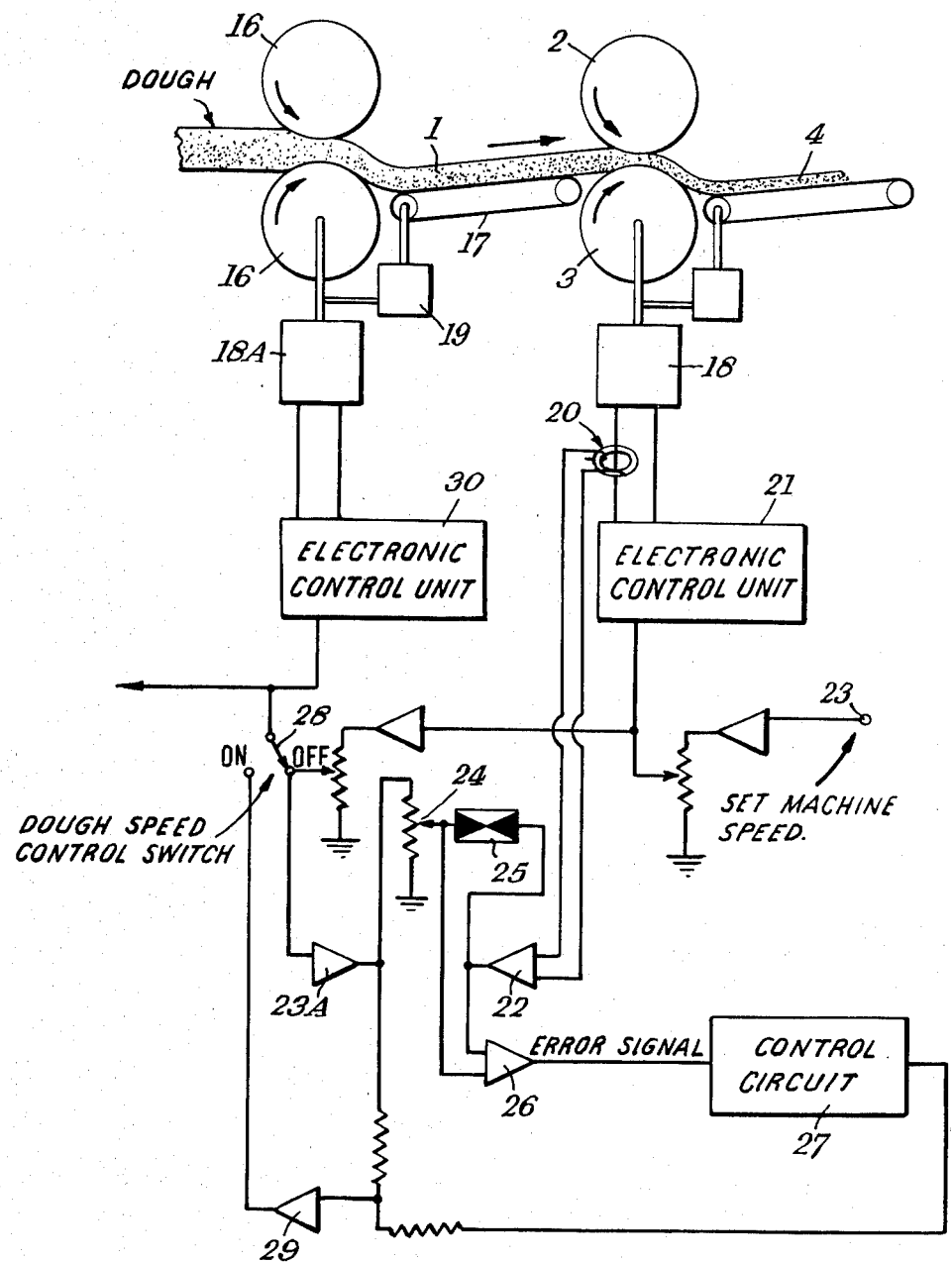
FIG. 6 is a block circuit diagram illustrating an alternative method of correcting the feed of the sheet.

In the embodiment shown in FIG. 5, the gauge rollers 2 and 3, to which a sheet of dough is fed by a preceding pair of feed rollers (not shown) as illustrated in FIG. 6, are driven by an electric motor 8 through a chain drive 9. An electrical power supply 10 passes through a transducer 11 to the motor 8. The transducer 11 passes a signal to a power—measuring circuit 12 and then to a signal—conditioning circuit 13 where the no-load component of the power signal is removed, the no-load component being that which represents the power required to drive the gauging rollers when no dough sheet is being gauged. A signal 14 derived from the roller 3 which indicates the rotational speed of the rollers 2 and 3 is passed to the signal—conditioning circuit 13. As the no-load component may be speed sensitive, a suitable correction is generated from the speed signal 14 applied to the signal—conditioning circuit 13. After these corrections have been made to the power signal, the remaining component thereof is amplified and passed to a control circuit 15 which in turn operates to adjust the speed of the preceding feed rollers as necessary to correct over- or under-feed of the sheet.

In operation the machine operative manually adjusts the gauge rollers 2 and 3 to provide a gap which produces a gauged sheet of the required thickness at a given rate of dough feed. He then switches on the control circuit to cause any variation in the dough feed within a limited range to be automatically compensated for. Any variation outside the limited range would indicate a serious situation and an audible signal is given to alert the operative to take steps to discover and correct the breakdown in the dough supply.

FIG. 6, which shows an alternative in which variations in the torque absorbed by the gauge rolls 2, 3 are used instead of variations in the power absorbed by the gauge rollers to control the feed of the sheet of dough, illustrates how the sheet 1 is fed to the gauge rollers by a preceding pair of feed rollers 16 and a belt 17. The gauge rollers 2, 3 are driven by a variable speed electrical drive unit 18 and the feed rollers 16 are driven by a variable speed electrical drive unit 18A which also drives the belt 17. A speed differential unit 19 provides a differential speed between the belt 17 and the feed rollers 16, and any change in the speed of the feed rollers produces a corresponding change in the speed of the belt.

The torque absorbed by the gauge rollers is determined by deriving, by means of a device 20, an electrical signal representing the current supplied to the drive unit 18 from an electronic control circuit 21. This signal is applied to a buffer amplifier 22.

A normal speed demand signal, derived from a terminal 23, is applied both to the control circuit 21 and to a buffer amplifier 23A in a circuit, shown at the left hand side of FIG. 6, which controls the feed of dough by the feed rollers 16. The outputs of the amplifiers 22 and 23A are fed to an operator's balance control which consists of a potentiometer 24 and a zero centre balance indicator 25.

When the biscuit cutting machine is running under normal production conditions, the operator adjusts the potentiometer 24 to set the indicator 25 at zero. The two inputs to a differential amplifier 26 will then be equal and no error signal will be applied to a control circuit 27 connected to the output of the amplifier 26. After the operator has made this setting, he moves a dough feed control switch 28 to the on position.

The outputs of the amplifier 23A and of the control circuit 27 are connected to the inputs of a summing amplifier 29. Under the required condition of dough feed, the output of the amplifier 29 is equal to the speed demand signal. When, however, there is a variation in the torque demanded by the gauge rollers 2, 3, an error signal appears at the output of the amplifier 26. The resulting change in output of the amplifier 29 is applied to an electronic control unit 30 which adjusts the drive unit 18A and changes the speed of the feed rollers 16 to restore the torque to its original level.

The method according to the invention provides an automatic control system which does not require measuring devices of the contacting type or optical sensors which tend to get in the way of the operatives in their role of supervising the apparatus and keeping it in trouble-free operation. It is more accurate in operation and represents a considerable saving in capital cost over the known measuring and control system hitherto used for gauge rolling of dough.

I claim:

1. An apparatus for supplying a sheet of biscuit dough having a predetermined and uniform thickness to a cutting apparatus, the apparatus including a pair of gauge rollers which are spaced apart a predetermined amount and form a nip therebetween through which the sheet of biscuit dough passes; a pair of feed rollers between which the sheet of biscuit dough passes before entering the nip between the gauge rollers; a first electrical drive unit connected to the gauge rollers to cause them to rotate; a second electrical drive unit connected to the feed rollers to cause them to rotate; a transducer connected to the first drive unit for measuring the power consumed thereby and for providing an electrical signal representative thereof; and electrical control means connected between the transducer and the second electrical drive unit to cause the second electrical drive unit to rotate the feed rollers at a suitable speed based on the deviation of the electrical signal from the transducer from a desired value.

2. The apparatus as defined in claim 1 wherein the electrical control means includes a power-measuring circuit which operates on the electrical signal from the transducer, a signal-conditioning circuit which is connected to the output of the power-measuring circuit, and a control circuit which is connected to the output of the power-measuring circuit, the output from the control circuit being fed to the second electrical drive unit.

3. An apparatus for supplying a sheet of biscuit dough having a predetermined and uniform thickness to a cutting apparatus, the apparatus including a pair of gauge rollers which are spaced apart a predetermined amount and form a nip therebetween through which the sheet of biscuit dough passes; a pair of feed rollers between which the sheet of biscuit dough passes before entering the nip between the gauge rollers; a first electrical drive unit connected to the gauge rollers to cause them to rotate; a second electrical drive unit connected to the feed rollers to cause them to rotate; means for generating an electrical signal representing the torque applied to the gauge rollers; first means for comparing the measured value of the torque with a pre-settable reference level; and second means for effecting a compensating adjustment of the second electrical drive unit driving the feed rollers upon departure of the measured torque from the reference level.

4. The apparatus as defined in claim 3 wherein said first and second means include a first amplifier for the electrical signal representative of the torque applied to the gauge rollers, a second amplifier for an electrical signal representing the reference level, a pre-settable balance control connected between the outputs of the first and second amplifiers, a differential amplifier having inputs which separately receive the outputs of the first and second amplifiers, and a control circuit responsive to an error signal at the output of the differential amplifier and operative to effect the compensating adjustment of the second electrical drive unit driving the feed rollers.

* * * * *